United States Patent [19]

Gart

[11] 3,950,994

[45] Apr. 20, 1976

[54] TEMPERATURE MEASURING DEVICE

[75] Inventor: Mark Gart, San Francisco, Calif.

[73] Assignee: T. M. Saigh Venture Financial Ltd., San Francisco, Calif.

[22] Filed: Oct. 15, 1973

[21] Appl. No.: 398,335

[52] U.S. Cl. ................................ 73/371; 73/368
[51] Int. Cl.² .................................... G01K 5/02
[58] Field of Search ............. 73/371, 372, 373, 368, 73/356; 251/327, 326

[56] References Cited
UNITED STATES PATENTS

| | | | |
|---|---|---|---|
| 3,321,176 | 5/1967 | Bolling | 251/327 |
| 3,717,035 | 2/1973 | Klingler | 73/371 |

FOREIGN PATENTS OR APPLICATIONS

| | | | |
|---|---|---|---|
| 16,549 | 8/1905 | United Kingdom | 73/371 |

*Primary Examiner*—S. Clement Swisher
*Assistant Examiner*—Denis E. Corr

[57] ABSTRACT

Described is an improved Temperature Measuring Device which is controllably activatable prior to the making of a temperature measurement from a passive to an active mode; and whose physical display of temperature indication is irreversible, providing a permanent, fixed display as desired. This device consists of a tube which has a reservoir, a rise tube and a means of or a device for creating a discontinuity in the rise tube or between the rise tube and the reservoir. The reservoir contains a solution, the chemical or physical action of which is the basis for the temperature measurement. The rise tube is a containment for the solution when the solution experiences (thermal) expansion or contraction. The means of, or device for, discontinuity is used to impede the expansion or contraction between the reservoir and the rise tube or within the rise tube embodiment.

8 Claims, 10 Drawing Figures

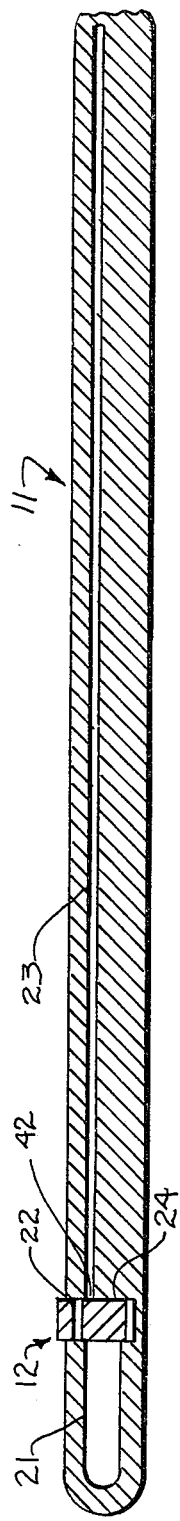
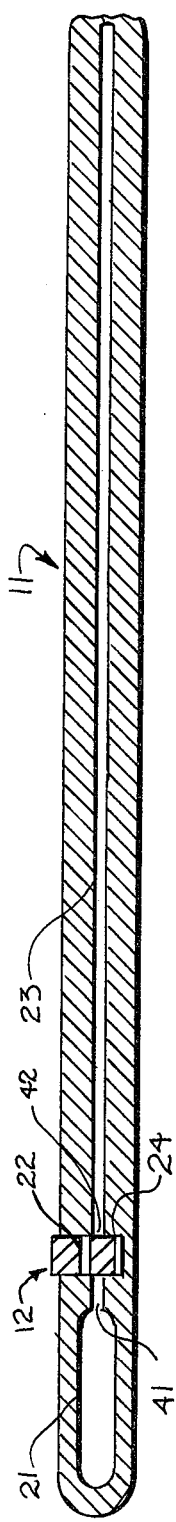
FIG. 1
FIG. 2

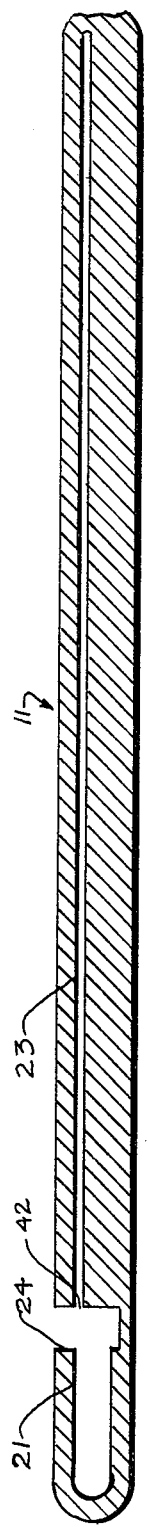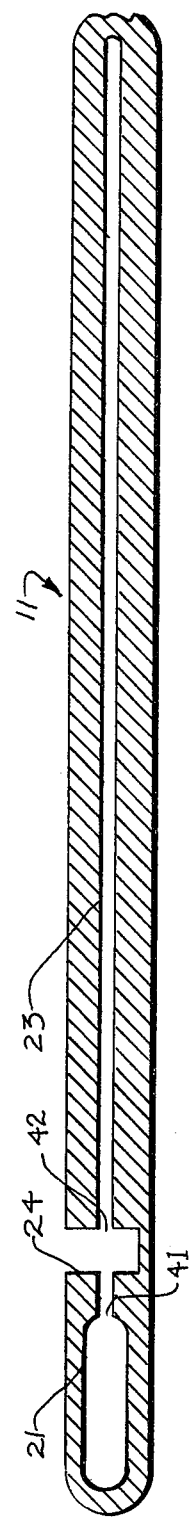

3,950,994

TEMPERATURE MEASURING DEVICE

BACKGROUND

This invention relates to temperature measuring devices generally known as thermometers. The standard fluid thermometers measure temperature as the differential rate of expansion between the container — generally glass — and the fluid contained therein, generally mercury or colored alcohol. Such thermometers are generally constructed in a tubular shape, with a fluid reservoir at one end. As the temperature of the environment of the thermometer changes, the fluid freely rises or falls in the tubular chamber due to the expansion or contraction of the body of fluid in the reservoir.

These types of thermometers are widely used in industry, medicine, and research. For example, this type of temperature measuring device is used in medicine for monitoring the temperatures of patients. Most devices of this type must be manually manipulated in some manner to compensate for ambient, background or residual temperatures before they can be used to measure the temperature of the subject body or object.

It will be appreciated that the subject Temperature Measuring Device ("TMD") will not have to be manipulated to compensate for ambient, background or residual temperatures. This TMD will be activated by the removal or elimination of the discontinuity factor in the rise tube. This discontinuity factor (an insertion device) eliminates interference from ambient, background and residual temperatures as it isolates the solution in the reservoir until the TMD is placed in the body or object for temperature measurement and activated. No manual manipulations are required of this TMD to prepare it for temperature measurement. Moreover, where the need exists for a rapid measurement of temperature(s), the limitation of the aforementioned manipulations reduces the amount of time involved and the consequent labor expenses due to such manipulations. Further, once equilibrium has developed between the reservoir and the rise tube, a permanent fixed display of the temperature indication is obtained.

SUMMARY OF THE INVENTION

The present invention is a device for measuring temperature of a body or object without prior manipulations to compensate for ambient, background or residual temperature, thus facilitating more rapid temperature determinations.

The TMD is positioned in such a manner as to expose the fluid reservoir end of the TMD to the body or object whose temperature is to be determined. When such exposure is achieved, the solution in the reservoir undergoes thermal expansion or contraction, creating a differential in the solution volume occurring in the rise tube, and/or reacting with the rise tube.

As a salient feature, this TMD has a discontinuity between the reservoir and the rise tube, or within the rise tube embodiment by an insert device. When activated, the discontinuity is eliminated by the alignment of a channel in the insertion device or by destruction of the insertion device.

THE DRAWINGS

With reference to the accompanying four sheets of drawings:

FIG. 1 is a longitudinal cross-sectional view through a preferred embodiment of a Temperature Measuring Device (the invention) in its inactivated state of discontinuity;

FIG. 2 is another longitudinal cross-sectional view through a preferred embodiment of a TMD (the invention) in its inactivated state of discontinuity;

FIG. 5 is another cross-sectional view of the preferred embodiment of FIG. 1 illustrating the same without insert device in place;

FIG. 6 is another cross-sectional view of the preferred embodiment of FIG. 2 illustrating the same without insert device in place;

DETAILED DESCRIPTION OF THE PREFERRED EMBODIMENT

Figure 3:
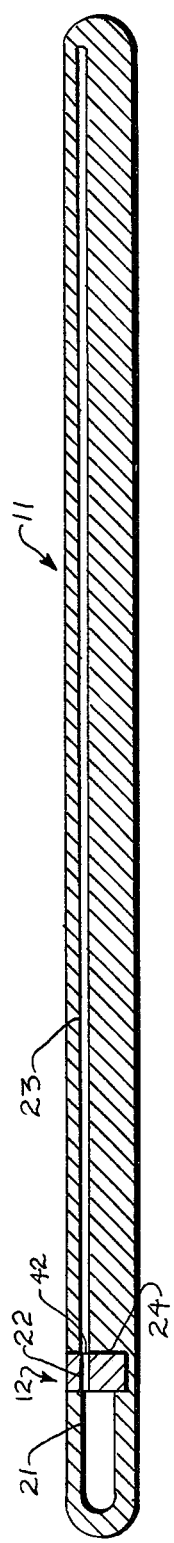
FIG. 3 is another cross-sectional view of the preferred embodiment of FIG. 1 illustrating the same when it is activated thus removing the discontinuity.
Figure 4:
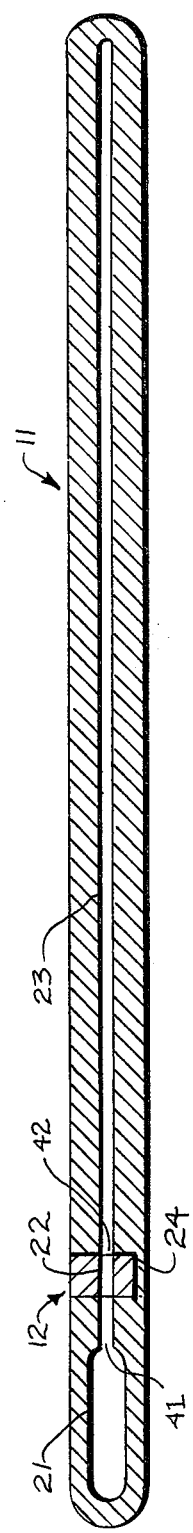
FIG. 4 is another cross-sectional view of the preferred embodiment of FIG. 2 illustrating the same when it is activated, thus removing the discontinuity.

Reference is made to FIGS. 1–10 which are cross-sectional views longitudinally through the preferred embodiments of the Temperature Measuring Device (TMD) (the invention) generally referred to by the reference numeral 11 and an insert device of suitable material such as plastic or metal generally referred to by the reference numeral 12. In general, the TMD 11 is a tubular body externally calibrated according to the usual methods, of suitable material, such as plastic, designed to withstand pressures and stresses; this TMD includes three chambers: reservoir 21, a rise tube 23, and an insert device cavity 24. The insert device 12 is positioned in cavity 24 forming a seal to withstand fluid pressure in the TMD 11. The insert device 12 is positioned in cavity 24 in the TMD 11.

When TMD 11 is activated, channel 22 with or without constriction 31 in the insert device 12 is aligned with the orifice 41 of the reservoir 21 with or without constriction 32, and the rise tube 23 with or without constriction 32 allowing flow to or from the rise tube 23 and reservoir 21.

When inactivated, channel 22 in the insert device 12 is non-aligned with either the orifice 41 of the reservoir 21 or the orifice 42 of the rise tube 23 preventing flow between the two chambers, reservoir 21 and rise tube 23.

Figure 8:
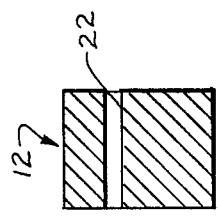
FIG. 8 is an enlarged cross-sectional view of the insert device without constriction in the preferred embodiment which controls the discontinuity shown in FIG. 1-4.
Figure 9:
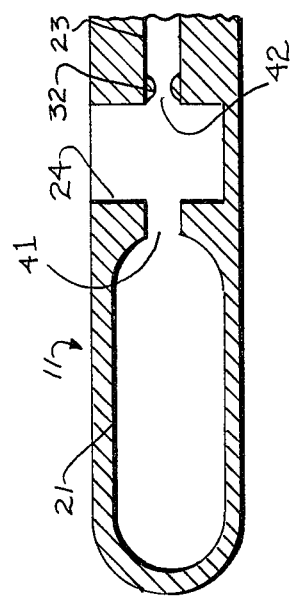
FIG. 9 is another cross-sectional view of the preferred embodiment of FIG. 6 illustrating the same with constriction in the rise tube.
Figure 7:
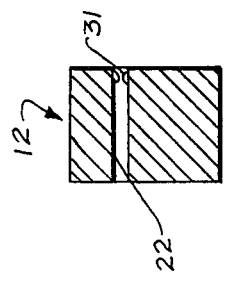
FIG. 7 is an enlarged cross-sectional view of the insert device with construction of the preferred embodiment which controls the discontinuity shown in FIG. 1-4.
Figure 10:
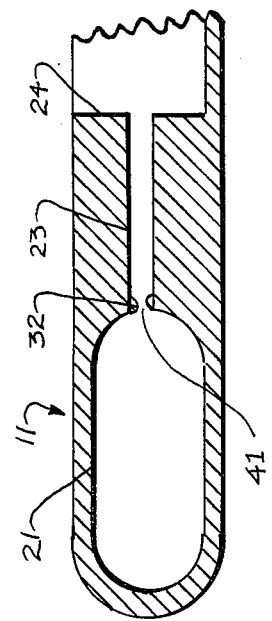
FIG. 10 is another cross-sectional view of the preferred embodiment of FIG. 6 illustrating the same with constriction at the reservoir orifice.

Reference is made to FIG. 7 and 8 which are cross-sectional views through the preferred embodiment of the insert device 12 with its channel 22 with or without constriction 31 which creates the continuity or discontinuity between the reservoir 21 and rise tube 23 or within the rise tube 23 dependent upon its alignment with the said orifices as shown in FIGS. 9 and 10.

When channel 22 is aligned with rise tube 23 and reservoir 21 prior to contact with object or body whose temperature is desired, the TMD is activated, allowing the solution to flow from reservoir 21 through channel 22 into rise tube 23 or from rise tube 23 through channel 22 to reservoir 21, thereby the temperature of the object or body is determined on the basis of thermal expansion or contraction of said solution of suitable composition such as an organic solvent or water.

As said solution starts to flow through channel 22 into rise tube 23, a chemical reaction may or may not occur, depending on use of said TMD 11, between the rise tube 23 and the solution. This reaction may or may not be perceived as an irreversible change in optical clarity, thus facilitating an easier transfer of data from the TMD 11 which is calibrated by standard thermodynamic consideration.

It may be further appreciated that once equilibrium has developed between the reservoir and the rise tube, capillary action across constriction 31 or 32 prevents any return flow to the reservoir, thereby providing a permanent fixed display of the temperature indication in the rise tube. This display is useful for later verification purposes, as well as for analog data interrogation and processing purposes.

Thus, is may be appreciated that the instant invention discloses a Temperature Measuring Device which is both controllably activatable prior to the making of a temperature measurement, and whose physical display of temperature indication is irreversible, providing a permanent fixed display.

I claim:

1. A permanent-display Temperature Measuring Device comprising a fluid reservoir for thermal contact with the object whose temperature is to be measured, a generally tubular fluid-expansion chamber, a controllable one-way valve unit disposed between said reservoir and said chamber, and a working fluid contained within said reservoir; said control unit in a first position of orientation obstructing the flow of said fluid from said reservoir into said chamber and isolating said fluid in said reservoir and in a second position of orientation putting said reservoir in fluid flow communication with said chamber, the fluid pressure in said reservoir being greater than the pressure in said chamber while said valve-unit is in said second position of orientation; said valve unit being only moveable from said first position to said second position.

2. The Temperature Measuring Device set forth in claim 1, wherein said controllable valve unit comprises a slot in said fluid-expansion chamber and a plug slidably inserted therein, said plug having at least one fluid conduit therethrough or thereby; said plug in said first position of valve-unit orientation obstructing flow communication between said reservoir and said chamber; said plug in said second position of valve-unit orientation having said conduit forming a fluid-flow passage between said reservoir and said chamber, such that said fluid will flow from said reservoir into said chamber due to said greater pressure in said reservoir.

3. The Temperature Measuring Device set forth in claim 2, wherein said reservoir has at least one outlet orifice, wherein said chamber has at least one inlet orifice, and wherein each said plug conduit in said second position of orientation is respectively aligned with each said outlet orifice and each said inlet orifice so as to form fluid flow passages therebetween.

4. The Temperature Measuring Device set forth in claim 3, wherein, prior to thermal contact with said object whose temperature is to be measured, said valve-unit is activated by moving said valve-unit from said first position of orientation to said second position so as to permit said working-fluid to flow from said reservoir into said chamber so as to stabilize at an equilibrium position related to the ambient temperature; and subsequently said reservoir is placed in said thermal contact with said object, such that said temperature of said fluid will be modulated to said temperature of said object, thereby causing a thermal volumetric change in said fluid which may be related to said temperature of said object.

5. The Temperature Measuring Device set forth in claim 4, wherein said fluid is caused to chemically react in or with said chamber (rise tube) so as to alter the optical opacity of said fluid in relation to said temperature of said object.

6. The Temperature Measuring Device set forth in claim 5, wherein said reaction is irreversible.

7. A temperature Measuring Device comprising a fluid reservoir for thermal contact with the object whose temperature is to be measured, a generally tubular fluid-expansion chamber, a controllable valve-unit disposed between said reservoir and said chamber, and a working fluid contained within said reservoir; said control unit in a first position of orientation initially obstructing the flow of said fluid from said reservoir into said chamber and isolating said fluid in said reservoir; said control unit in a second position of orientation putting said reservoir in fluid flow communication with said chamber, the fluid pressure in said reservoir being greater than the pressure in said chamber while said valve-unit is in said second position of orientation; wherein said controllable valve-unit comprises a slot in said fluid-expansion chamber and a plug slidably inserted therein, said plug having at least one fluid conduit therethrough; said plug in said first position of valve-unit orientation obstructing flow communication between said reservoir and said chamber; said plug in said second position of valve-unit orientation having said conduit forming a fluid-flow passage between said reservoir and said chamber, such that said fluid will flow from said reservoir into said chamber due to said greater pressure in said reservoir; wherein said reservoir has at least one outlet orifice, wherein said chamber has at least one inlet orifice, and wherein each said plug conduit in said second position of orientation is respectively aligned with each said outlet orifice and each said inlet orifice so as to form fluid flow passages therebetween; wherein, prior to thermal contact with said object whose temperature is to be measured, said valve-unit is activated by moving said valve-unit from said first position of orientation to said second position so as to permit said working-fluid to flow from said reservoir into said chamber so as to stabilize at an equilibrium position related to the ambient temperature; and subsequently said reservoir is placed in said thermal contact with said object, such that said temperature of said fluid will be modulated to said temperature of said object, thereby causing a thermal volumetric change in said fluid which may be related to said temperature of said object; and wherein said fluid is caused to chemically react in or with said chamber so as to alter the optical opacity of said fluid in relation to said temperature of said object.

8. The Temperature Measuring Device set forth in claim 7 wherein said reaction is irreversible.

* * * * *